United States Patent [19]

Scheerer

[11] 4,197,027
[45] Apr. 8, 1980

[54] AXIAL BALL-JOINT

[75] Inventor: Wolfgang Scheerer, Meerbusch, Fed. Rep. of Germany

[73] Assignee: A. Ehrenreich GmbH & Co. KG., Düsseldorf, Fed. Rep. of Germany

[21] Appl. No.: 941,021

[22] Filed: Sep. 11, 1978

[30] Foreign Application Priority Data

Sep. 23, 1977 [DE] Fed. Rep. of Germany ....... 2742837

[51] Int. Cl.² ............................................. F16C 11/06
[52] U.S. Cl. ...................................... 403/56; 403/133
[58] Field of Search ................. 403/56, 122, 133, 142, 403/135, 132, 134, 137, 139, 140, 284

[56] References Cited

U.S. PATENT DOCUMENTS

| | | | |
|---|---|---|---|
| 1,898,100 | 2/1933 | Skillman | 403/139 X |
| 2,433,594 | 12/1947 | Calo | 403/142 X |
| 3,506,290 | 4/1970 | Gottschald | 403/134 |
| 3,677,585 | 7/1972 | Scheerer | 403/140 |
| 3,787,129 | 1/1974 | Kohler | 403/135 |

Primary Examiner—Wayne L. Shedd
Attorney, Agent, or Firm—Ernest F. Marmorek

[57] ABSTRACT

A ball-joint includes a housing with an inwardly facing projection, a ball socket secured to the housing near an end thereof, and a ball pin engaged in the ball socket. A portion of the ball socket extends towards the ball, so as to at least partially surround the ball, and has a plurality of slots extending in a meridional direction towards the free end of the ball socket, so as to form tongues between the slots. The ball socket has an external groove in a portion thereof extending in a direction away from the ball, which engages the projection of the housing, so that the ball pin may be inserted into the ball socket by elastically deforming the tongues, and subsequently the ball socket may be slid into the housing.

7 Claims, 1 Drawing Figure

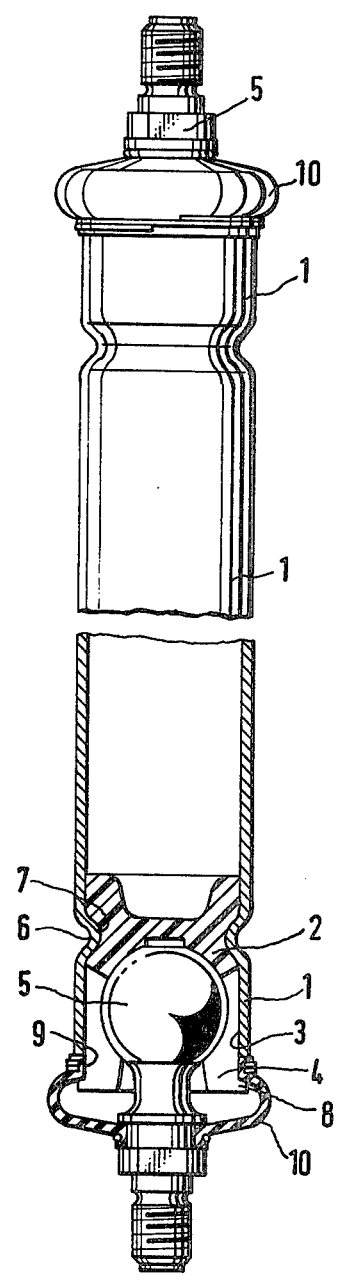

AXIAL BALL-JOINT

BACKGROUND OF THE INVENTION

The present invention relates to an axial joint, namely a ball-joint, in which the housing and the ball pin have a common axis in the center position of the ball pin. Axial joints of this type are frequently in use in the construction of vehicles, mostly as a stabilizing strut with a ball-joint on each end.

Ball-joints of the prior art require a ball socket, which, following manufacture, require further processing or handling.

SUMMARY OF THE INVENTION

It is one of the objects of the present invention to obviate the disadvantages of the prior art, and to particularly devise a ball-joint or a stabilizing strut, which can be manufactured in a particularly economical manner.

This object is attained, according to the present invention, by using a housing, including an inwardly facing projection, a ball socket secured to the housing near an end thereof, and a ball pin engaged in the ball socket. A portion of the ball socket extends towards the ball, so as to at least partially surround the ball, and has a plurality of slots extending in a meridional direction, towards the free end of the ball socket, so as to form tongues between the slots. The ball socket has an external groove in a portion thereof extending in a direction away from the ball, which engages the projection of the housing, so that the ball pin may be inserted into the ball socket by elastically deforming the tongues and subsequently the ball socket may be slid into the housing.

It is advantageous, if the projection is an annular corrugation in the housing, and if the groove is ring-shaped.

It is further preferable if the projection extends at a predetermined depth, at least partially into the slotted portion of the ball socket, so as to control the ease of movement of the ball-joint in dependence of the predetermined depth.

It is preferable if the housing is tubular, and the ball socket is formed with a collar, which has an outer diameter about equal to the outer diameter of the housing, and if a gap is defined between the end of the housing and the collar for receiving protective bellows.

In one version of the invention, the housing is elongated and a second ball socket, with a second ball pin, is disposed at the other end of the elongated housing, which ball socket and ball pin are substantially similar to the first ball socket and the first ball pin, so that the ball-joint may be used as a stabilizing strut.

In a preferred version of the invention, the ball socket is composed of elastic hard rubber.

The combination of the aforesaid features permits an unusually inexpensive manufacturing process. For example, the gap defined between the end of the housing and the collar for receiving protective bellows, need no longer be formed in a housing, as it will arise naturally by appropriate dimensioning of the tubular housing and the ball socket itself.

The composition of the ball socket, which is made of elastic hard rubber, makes it possible that no further processing is needed following its manufacture. Commercially available tubing serves as a housing. The assembly of the device is accomplished in a known manner: the ball of the ball pin is inserted into the ball socket, and the ball socket is inserted into the housing.

In lieu of terminating the housing, as has been the practice hitherto, on both ends, the ball socket is secured to the housing, according to the invention, by an annular corrugation, projecting inwardly from the tube, which engages a corresponding ring-shaped groove of the ball socket. Thus, the only portion of the ball-joint which has to be further processed, or worked on, is the ball pin itself, so that the ball-joint, according to the present invention, can be manufactured in a hitherto unattainable, inexpensive manner. This applies particularly if a stabilizing strut is used as a common housing, the strut being made of a single unitary tube, and where a ball-joint is used at each end of the tube.

BRIEF DESCRIPTION OF THE DRAWING

For a fuller understanding of the nature and objects of the invention, reference should be had to the following detailed description, taken in conjunction with the single FIGURE of the accompanying drawing, which shows a longitudinal strut, having a ball-joint at each end, in partial section.

DESCRIPTION OF THE PREFERRED EMBODIMENTS

In carrying the invention into effect, it will be seen that each ball-joint consists of a relatively thin-walled housing 1, which is formed by a cylindrical tube. In the housing 1, there is contained a ball socket, composed of hard elastic rubber, having a substantially cylindrical jacket 3, which jacket 3 has a plurality of slots 4, extending in a meridional direction towards the free end of the ball socket 2, so as to form tongues between the slots 4. These slots 4 permit the insertion of a ball pin 5, by elastically deforming the resilient tongues remaining between the slots, prior to inserting and securing the ball socket 2 into, and to the housing 1. The axial securing of the ball socket 2, and hence, of the ball of the ball pin 5, is accomplished by an annular corrugation 6 projecting inwardly from the cylindrical housing 1, which corrugation 6 was obtained by deforming the cylindrical or tubular housing 7 following insertion of the ball socket 2, inclusive of the ball pin 5, and which corrugation engages an appropriate ring-shaped groove 7 of the ball socket 2. At its free end, the ball socket 2 is formed with a collar 8, which has an outer diameter corresponding to the outer diameter of the tubular housing 1. Between the end of the housing and the collar 8, there is defined an annular gap 9, for receiving protective bellows. This construction saves an otherwise additional processing step to ream out separately the circular groove.

The axial ball-joint, according to the present invention, can be manufactured individually and separately, according to the lower portion of the figure, or alternatively as a strut, for example, as a stabilizing strut, in which case a single tube 1' may be used. In this case, the tube 1' forms a common housing, a ball-joint being disposed on each end of the housing.

In dependence of the degree of pressure exerted by the tool for forming the annular corrugation, the ease of movement of the ball-joint itself can be appropriately influenced. If the projection on annular corrugation engages at least partially, the slotted region of the ball socket 2, the ease of movement of the joint is decreased by a stronger radial stress being exerted on the individual, resilient tongues remaining between the slots.

In spite of the simplicity of the joint, any differences in tolerances, which might result in differing degrees of ease of movement of the joints, may be equalized by appropriately selecting the pressure exerted by the tool during the manufacturing step in which the annular corrugation in the tubing is formed.

I wish it to be understood that I do not desire to be limited to the exact details of construction shown and described, for obvious modifications will occur to a person skilled in the art.

I claim:

1. A ball-joint, comprising in combination:

a tubular housing including an inwardly facing projection, a socket secured to the interior of said housing near an end thereof, and a ball pin engaging said socket, a portion of said socket extending towards the ball and at least partially surrounding the ball, said portion having a plurality of meridianal slots extending towards the free end of said socket forming tongues between said slots, said socket including a part extending in a direction away from the ball and defining a groove that engages said inward projection, whereby said ball pin may be inserted into said socket by elastically deforming said tongues.

2. A ball-joint according to claim 1, wherein said projection is an annular corrugation in said housing, and wherein said groove is ring-shaped.

3. A ball-joint according to claim 1, wherein said projection extends at a predetermined depth, at least partially, into the slotted portion of said socket, so as to control the ease of movement of the ball-joint in dependence of said predetermined depth.

4. A ball-joint according to claim 1, wherein said socket is formed with a collar having an outer diameter about equal to the outer diameter of said housing, a gap being defined between the end of said housing and said collar for receiving protective bellows.

5. A ball-joint according to any one of claims 1 or 2 through 4, wherein said housing is elongated, and further comprising a second socket and a second ball pin disposed at the other end of said elongated housing and substantially similar to the first socket and the first ball pin, whereby said ball-joint may be used as a stabilizing strut.

6. A ball-joint according to claim 1, wherein said socket is composed of elastic rubber.

7. A ball joint as claimed in claim 1, wherein said tubular housing is deformed along its periphery at a predetermined distance thereof, so as to result in said inwardly facing projection.

* * * * *